United States Patent
Braun

[11] Patent Number: 5,884,407
[45] Date of Patent: Mar. 23, 1999

[54] DEVICE FOR DETECTING POSITIONAL CHANGES

[76] Inventor: Paul-Wilhelm Braun, Lindlau Str. 23, 53842 Troisdorf, Germany

[21] Appl. No.: 609,390

[22] Filed: Mar. 1, 1996

[30] Foreign Application Priority Data

Mar. 3, 1995 [DE] Germany .................. 195 07 466.1

[51] Int. Cl.[6] ........................................ G01C 9/16
[52] U.S. Cl. ................................. 33/395; 340/402
[58] Field of Search ..................... 116/29 E; 73/514.26; 340/429; 33/1 PT, 395, 402

[56] References Cited

U.S. PATENT DOCUMENTS

| | | | |
|---|---|---|---|
| 3,707,772 | 1/1973 | Cotter | 33/373 |
| 3,975,831 | 8/1976 | Jysky et al. | 33/333 |
| 4,385,449 | 5/1983 | Miller | 33/304 |
| 5,174,035 | 12/1992 | Yamazaki | 33/395 |

FOREIGN PATENT DOCUMENTS 42 13 500 C2   10/1993   Germany .

OTHER PUBLICATIONS

JP 62–197712 (A), Patent Abstracts of Japan P–667 16 Feb. 1998, vol. 12/No. 51.
Soviet Patent Abstracts, SU–S, Instrumentation, Measuring and Testing, Week 9317, S–02,93–142252/17. SU 1737272 A1.
M. Pollerman, Bauelemente der physikalischen Technik, Springer Verlag, Berlin–Göttingen–Heidelberg 1955, S. 100–101.

*Primary Examiner*—Ronald L. Biegel
*Attorney, Agent, or Firm*—Darby & Darby

[57] ABSTRACT

A motion sensor has a carrier which rotatably supports a shaft. One or more eccentric weights are mounted on the shaft for rotation therewith. The carrier is supported by pins which are normal to the shaft and rotatable on bearings. One of the pins carries a disk with marks in the form of lines, and a sensing device for the marks is disposed adjacent the disk. This pin further carries a transmission component which cooperates with a transmission component on the shaft. When an object on which the motion sensor is mounted is tilted about the axis of the shaft, the weights are displaced from an equilibrium position. The weights return to the equilibrium position under the action of gravity thereby rotating the shaft which, in turn, rotates the disk via the transmission components. If the object is tilted about the axes of the pins, inertia causes rotation of the disk. The rotation of the disk is detected by the sensing device which can trigger an alarm.

27 Claims, 6 Drawing Sheets

DEVICE FOR DETECTING POSITIONAL CHANGES

BACKGROUND OF THE INVENTION

The invention relates to a motion sensor or a device for detecting positional changes.

Motion sensors of the type under consideration are capable of detecting positional changes along at least two axes of a three-dimensional coordinate system. These motion sensors are used on movable objects such as, for instance, passenger cars, which are stationary at times. The motion sensors generally include a weight, a transmission and a unit for sensing changes in position.

A motion sensor of this kind can be employed for various purposes, e.g., antitheft purposes. In such a case, the motion sensor is fixed to an object to be protected and activated when necessary. By way of example, if the object to be protected is a car, the motion sensor is activated upon leaving the car after parking. When the motion sensor is in its activated state and the object to be protected is moved out of its resting position, an acoustical or optical signal is generated so that unauthorized used can be detected immediately.

In many situations, the use of such motion sensors is made more difficult by special conditions. For instance, antitheft systems for cars must have low weight, small dimensions and absolute functional reliability, must be insensitive to climate and dust, must use little energy, and must be capable of being installed in any position.

SUMMARY OF THE INVENTION

It is an object of the invention to provide a motion sensor which can be relatively compact.

Another object of the invention is to provide a motion sensor which can be relatively lightweight.

An additional object of the invention is to provide a motion sensor which can be constructed so as to have a high degree of reliability.

A further object of the invention is to provide a motion sensor which can be designed for a wide range of applications.

It is also an object of the invention to provide a motion sensor which, although compact, lightweight, reliable and widely applicable, can be constructed largely or entirely from standard components.

Yet another object of the invention is to provide a highly reliable method of sensing motion.

The preceding objects, as well as others which will become apparent as the description proceeds, are achieved by the invention.

One aspect of the invention resides in a motion sensor or a device for detecting positional changes. The sensor comprises at least one rotatable shaft defining a first axis of rotation, and a force unit fast with the shaft and arranged to generate a force in response to rotation of the shaft about the first axis. The force unit and the shaft are rotatable together about a second axis of rotation. The sensor further comprises a displacement indicator rotatable about the second axis, and a transmission between the shaft and the indicator for rotating the indicator about the second axis in response to rotation of the shaft about the first axis.

It has been found that the motion sensor of the invention can reliably detect changes in position with a resolution of 10 minutes of arc and a, response angle of 0.5 degree. The dimensions of the entire motion sensor can be 30 mm×30 mm×30 mm, and the weight of the complete sensor can be maintained below 30 g.

Security devices are normally mounted in a security or switch chamber having outer dimensions of 125 mm×90 mm×39 mm. The motion sensor of the invention can thus be readily integrated in such a chamber, and the electronics necessary for evaluating changes in position can likewise be accommodated in the chamber. The complete security system can be installed anywhere in an object to be protected.

The motion sensor according to the invention is preferably placed in the security chamber after being assembled with a circuit board having terminals and connecting pins. In order to shield the electronics, the motion sensor can be encased in a metallic housing.

The indicated resolution of 10 minutes of arc can be achieved by making the displacement indicator in the form of a circular disk which is divided circumferentially into 1024 steps as is conventional. Each step has two flanks (rise, fall) for the generation of signals. The response angle of 0.5 degree is achieved taking into account the friction to be expected with two-point support. The accuracy is sufficient for the indicated applications but can be improved by using materials having low coefficients of friction.

Additional features and advantages of the invention will become apparent from the following detailed description of preferred embodiments when read in conjunction with the accompanying drawings.

DESCRIPTION OF THE PREFERRED EMBODIMENTS

Figure 1:
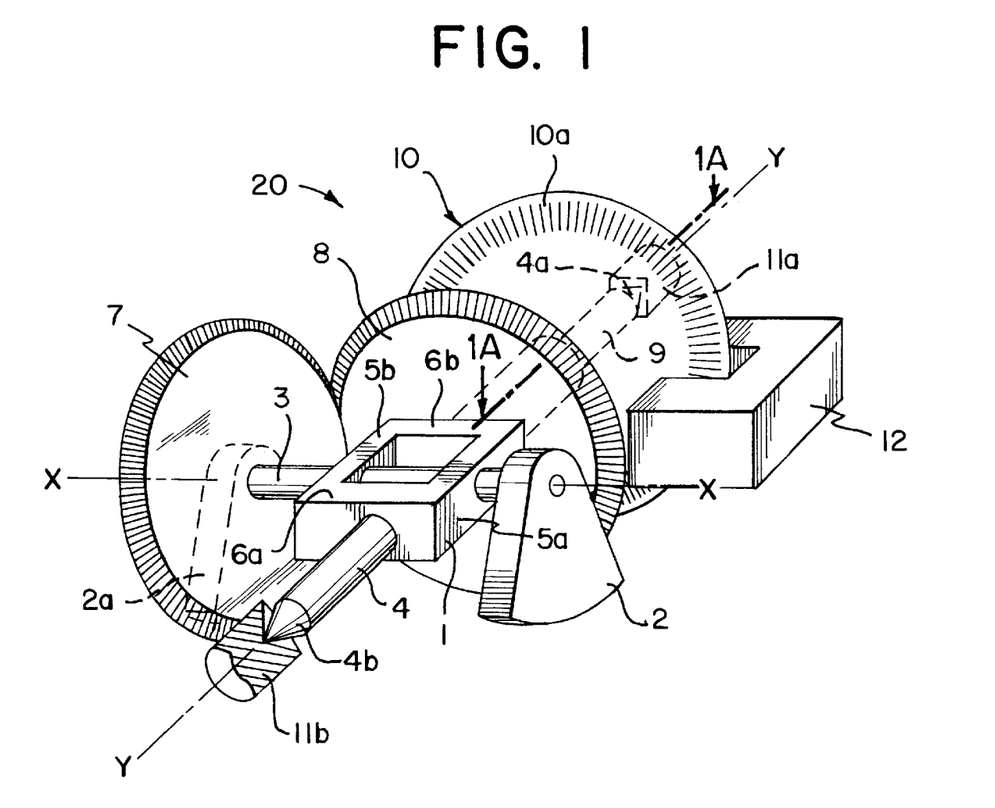
FIG. 1 is a perspective view of one embodiment of a motion sensor in accordance with the invention.
Figure 1A:
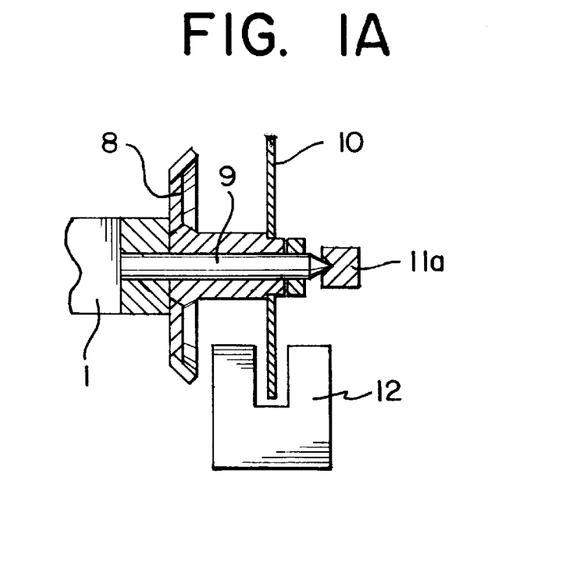
FIG. 1a is a sectional view as seen in the direction of the arrows 1A—1A of FIG. 1.

Referring to FIGS. 1 and 1a, the numeral 20 generally identifies a motion sensor in accordance with the invention. The motion sensor 20 is installed on or in a non-illustrated movable object which is stationary at times, and the motion sensor 20 is intended to detect displacements of the object, e.g., to prevent theft or unauthorized use of the object. The object can, for instance, be a passenger car.

The motion sensor 20 is designed to detect positional changes about at least two mutually perpendicular axes X and Y of a three-dimensional coordinate system. The axes X and Y are here located in a horizontal plane and the motion sensor 20 accordingly has a horizontal orientation.

The motion sensor 20 includes a frame-like journalling member 1. The journalling member 1 is rectangular and has a pair of parallel longer sides 5a, 5b as well as a pair of parallel shorter sides 6a, 6b.

The longer sides 5a, 5b are perpendicular to the X-axis, and each of the longer sides 5a, 5b is provided with an opening at its middle. A shaft 3 passes through the openings and is supported for rotation by the journalling member 1. The shaft 3 is free to rotate through 360 degrees, and the axis of rotation of the shaft 3 coincides with the X-axis.

An eccentric weight 2 is fixed to one end of the shaft 3 while an identical eccentric weight 2a is fixed to the opposite end of the shaft 3. The weights 2, 2a resemble or constitute pendulums which are rotatable about the X-axis. The weights 2, 2a form a force unit or gravity unit which generates a restoring moment or force under the action of gravity when the object on which the motion sensor 20 is mounted is tilted about the X-axis. The restoring force causes the shaft 3 and the weights 2, 2a to rotate as the object is tilted so that the shaft 3 and the weights 2, 2a tend to assume a rest or equilibrium position in which the weights 2, 2a are suspended vertically.

A bearing pin or shaft 4 projects outward from the shorter side 6a of the journalling member 1 whereas a second bearing pin or shaft 9 projects outward from the shorter side 6b of the member 1. The bearing pin 4 is fixed to the middle of the shorter side 6a and the bearing pin 9 is fixed to the middle of the shorter side 6b. The bearing pins 4, 9 are perpendicular to the shaft 3 and coincide with the Y-axis. The bearing pins 4, 9 are in alignment with one another, that is, the longitudinal axes of the bearing pins 4, 9 lie on a common line.

The bearing pin 4 has a bearing tip or portion 4b which rides in a bearing or calotte 11b. Similarly, the bearing pin 9 has a bearing tip or portion 4a which rides in a bearing or calotte 11a secured to a non-illustrated casing or housing of the motion sensor 20. Thus, the bearing pins 4, 9 are rotatable about the Y-axis. Since the bearing pins 4, 9 are fast with the journalling member 1, and the shaft 3 and weights 2, 2a are coupled to the member 1, the member 1, shaft 3 and weights 2, 2a are likewise rotatable about the Y-axis.

A bevel gear 7 is mounted on the shaft 3 between the weight 2a and the journalling member 1 and is rotatable with the shaft 3. The bevel gear 7 meshes with a second bevel gear 8 which is mounted on the bearing pin 9 for rotation therewith. The bevel gears 7, 8 constitute a tradsmission for transferring motion between the shaft 3 and the bearing pin 9.

Also mounted on the bearing pin 9 for rotation with the latter is a displacement or position indicator 10. The displacement indicator 10 is in the form of a timing disk which is provided with marks 10a at the periphery thereof. The marks 10a can, for instance, be constituted by a series of lines as shown.

The disk 10 is arranged so that the periphery of the disk 10 projects into a sensing device or detector 12 for the lines 10a.

Advantageously, an additional support for the bearing pin 9 is provided between the bevel gear 8 and the disk 10. To this end, a transverse bar can be held between the bevel gear 8 and the disk 10 by the motion sensor casing without affecting the operation of the motion sensor 20. In any event, the bevel gears 7, 8 and the disk 10 should be able to rotate about the X and Y axes through 360 degrees.

The operation of the motion sensor 20 is as follows:

It is assumed that the motion sensor 20 is fixed to a movable object to be monitored and that the object is stationary. Under these conditions, the weights 2, 2a are in a rest position in which the weights 2, 2a are suspended vertically.

If the object is now tilted about the X-axis, the journalling member 1 is likewise tilted about such axis. Since the shaft 3 and weights 2, 2a are coupled to the member 1, the shaft 3 and weights 2, 2a move with the member 1 so that the weights 2, 2a leave the rest position. However, once the weights 2, 2a are out of the rest position, the weights 2, 2a generate a restoring force, under the action of gravity, tending to return the weights 2, 2a to the rest position. The restoring force causes the shaft 3 to rotate relative to the member 1 in a sense such that the weights 2, 2a again assume the rest position.

The bevel gear 7 rotates with the shaft 3 and drives the bevel gear 8 mounted on the bearing pin 9. The bevel gear 8, in turn, rotates the bearing pin 9 and the disk 10 mounted on the pin 9. The corresponding movement of the lines 10a of the disk 10 is detected by the sensing device 12 which sends signals to a non-illustrated processing circuit.

If the object to which the motion sensor 20 is fixed is tilted about the Y-axis, the bearing pins 4, 9 rotate in the bearings 11a, 11b due to the inertia of the weights 2, 2a. Hence, the disk 10 mounted on the bearing pin 9 rotates again.

The motion sensor 20 is accordingly capable of detecting all displacements about the X and Y axes.

The motion sensor 20 has a horizontal orientation in that the shafts 3 and the bearing pins 4, 9 are horizontal, and this motion sensor 20 is preferably employed to detect rotational movements about X and Y axes which define a horizontal plane. The weights 2, 2a have a direct effect for both such axes. The bearings 11a, 11b should be located outside of a space defined by the plane of the bevel gear 7, the plane of the disk 10, a plane parallel to, and on the opposite side of the Y-axis from, the bevel gear 7 and tangential to the disk 10, and a plane parallel to, and on the opposite side of the X-axis from, the disk 10 and tangential to the bevel gear 7. The shaft 3 and bearing pins 4, 9 are then rotatable about the X and Y axes through 360 degrees without interference.

As indicated previously, the weights 2, 2a are mounted on a common shaft 3 and journalled in the longer sides 5a, 5b of the journalling member 1. The bevel gear 7 is likewise mounted on the shaft 3. The masses of the bevel gear 7 and of the weights 2, 2a are selected so as to achieve a stable equilibrium position when the shaft 3 is horizontal.

Figure 2:
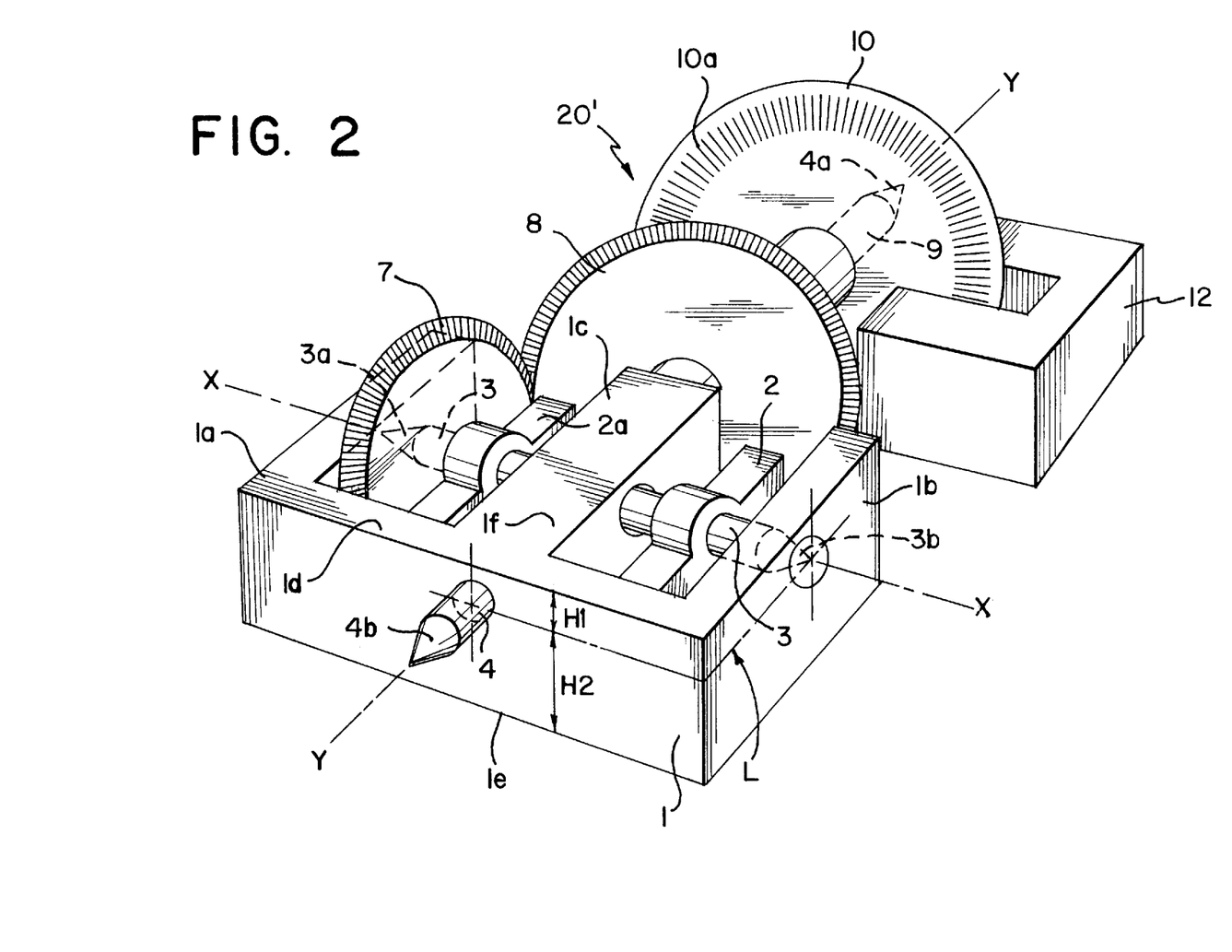
FIG. 2 is a perspective view of another embodiment of the motion sensor according to the invention.

FIG. 2 illustrates another motion sensor 20' in accordance with the invention. In FIG. 2, the same reference numerals as in FIGS. 1 and 1a are used to identify similar elements.

The motion sensor 20' differs from the motion sensor 20 mainly in the design of the journalling member 1 and the shaft 3. The journalling member 1 of the motion sensor 20' is W-shaped and has two outer legs 1a and 1b which flank a middle leg 1c. The legs 1a, 1b, 1c are bridged by a crosspiece 1d. The shaft 3 passes through the middle leg 1c with clearance and has pointed end portions or bearing elements 3a and 3b which are respectively journalled in the outer legs 1a and 1b. The weight 2a and bevel gear 7 are mounted on the shaft 3 between the outer leg 1a and middle leg 1c whereas the weight 2 is mounted on the shaft 3 between the middle leg 1c and the outer leg 1b. The bearing pins 4, 9 are in line with the middle leg 1c.

The journalling member 1 of the motion sensor 20' has a first major surface 1e to one side of the plane defined by the shaft 3 and the bearing pins 4, 9 and an opposed second major surface if to the other side of the plane. The major surfaces 1e, 1f are generally parallel to such plane and define the thickness of the journalling member 1. The shaft 3 and bearing pins 4, 9 are situated asymmetrically with respect to the major surfaces 1e, 1f. Thus, the shaft 3 and bearing pins 4, 9 are mounted at a location L between the major surfaces 1e, 1f which is spaced from the major surface 1f by a distance H1 and from the major surface 1e by a greater distance H2.

In contrast to the shaft 3 of the motion sensor 20, the shaft 3 of the motion sensor 20' is accommodated within the confines of the journalling member 1.

The asymmetrical mounting of the shaft 3 and bearing pins 4, 9 enhances the performance of the motion sensor 20', especially when the bearing pins 4, 9 are vertically oriented. The performance is further enhanced due to the reduction in friction obtained by supporting the shaft 3 for rotation on the pointed end portions 3a, 3b.

Figure 3:
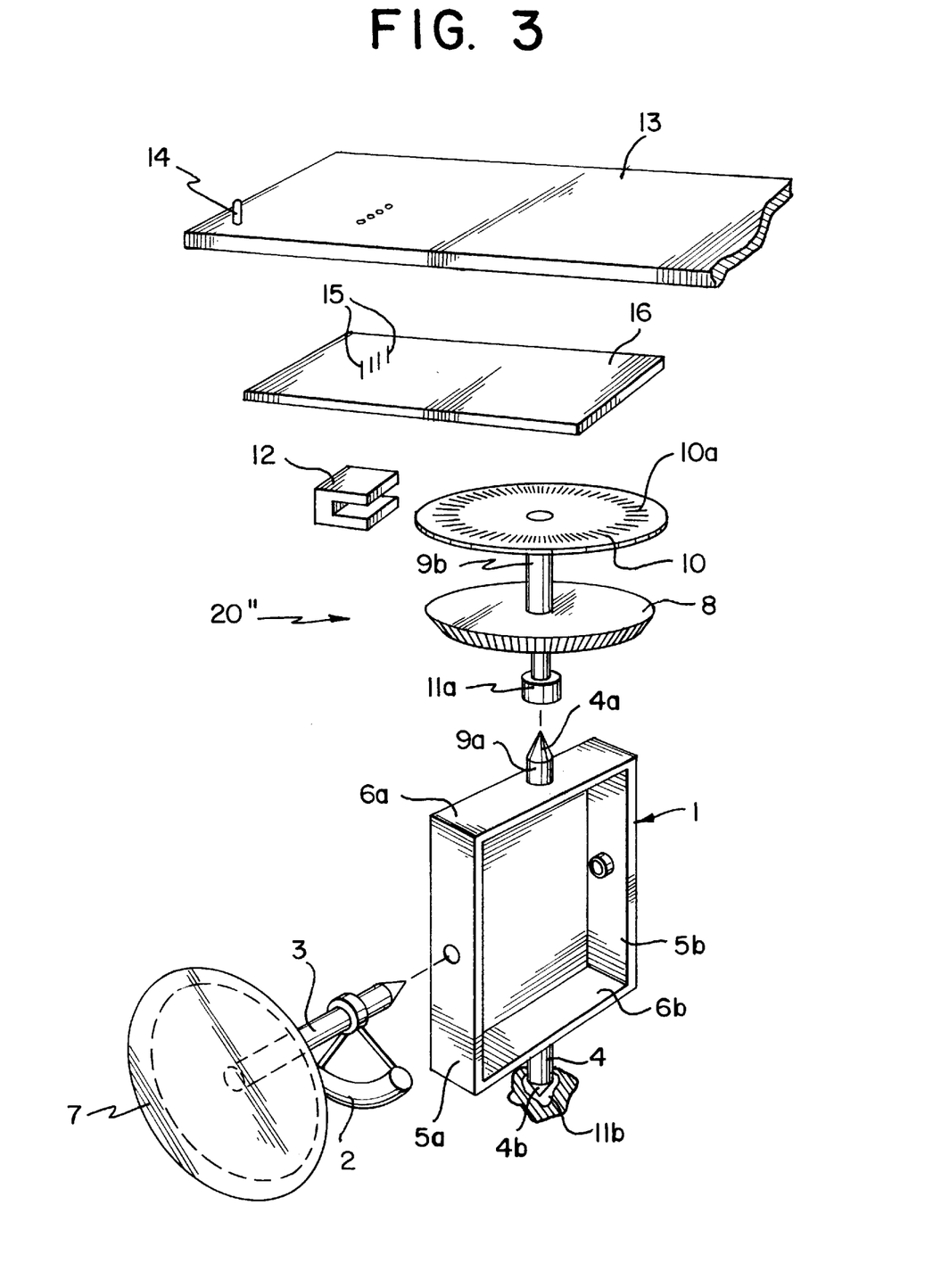
FIG. 3 is an exploded view of an additional embodiment of the motion sensor in accordance with the invention.
Figure 4:
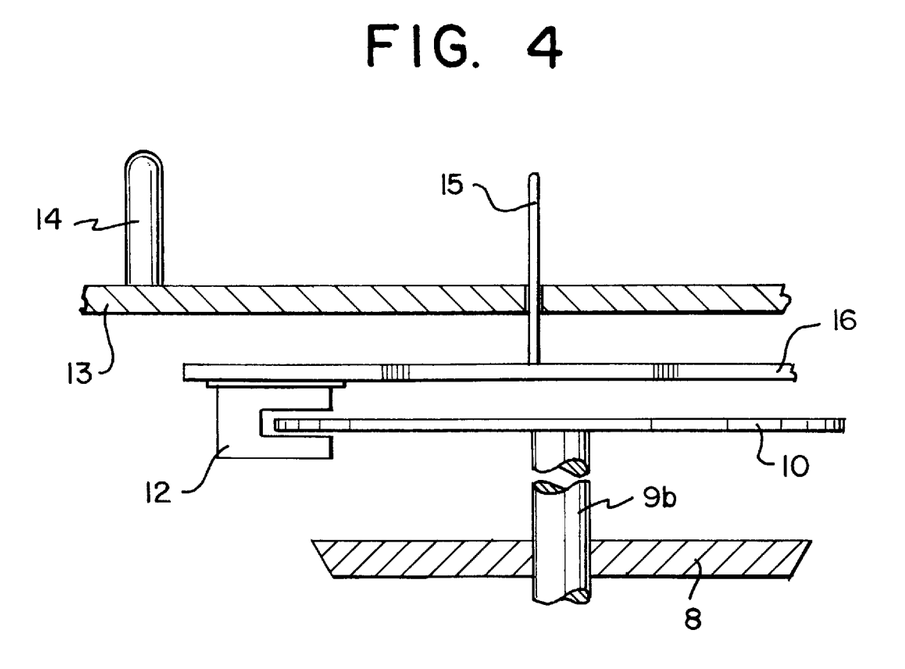
FIG. 4 is a sectional view illustrating alignment of the motion sensor of FIG. 3 relative, and connection of the motion sensor, to a housing.
Figure 5:
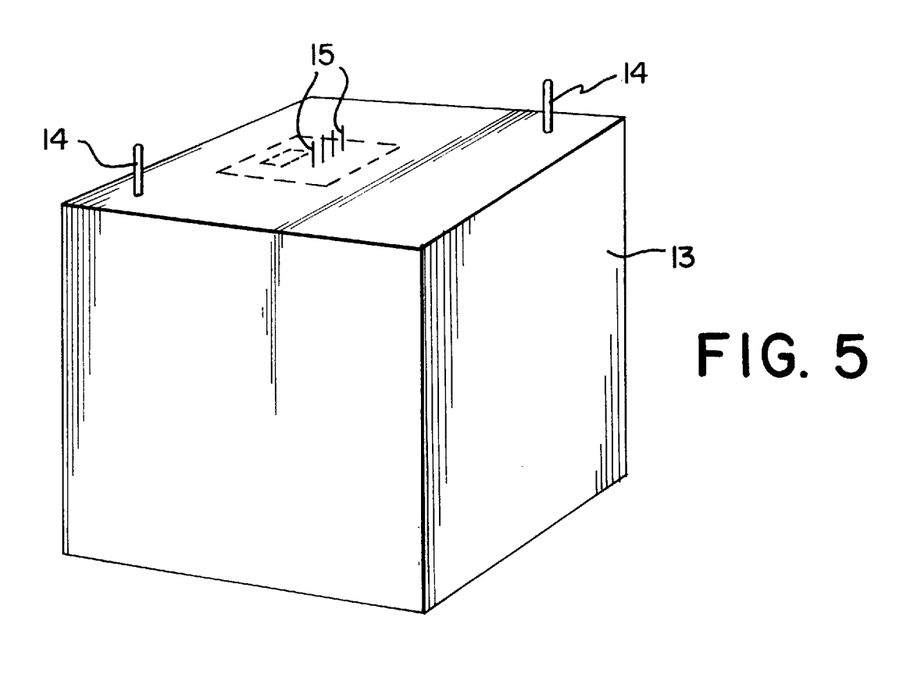
FIG. 5 is a perspective view of the housing for the motion sensor of FIG. 3.

FIGS. 3–5 depict an additional motion sensor 20" according to the invention. In FIGS. 3–5, the same reference numerals as in FIGS. 1, 1a and 2 are used to identify similar elements.

The motion sensor 20" resembles the motion sensor 20 but differs therefrom in that the weight 2a is omitted. The weight 2 of the motion sensor 20" is disposed at the center of the journalling member 1.

Moreover, in the motion sensor 20", the bearing pin or shaft 9 of the motion sensor 20 is replaced by two bearing pins or shafts 9a and 9b. The bearing pin 9a is provided with the bearing tip 4a and is fixed to the shorter side 6a of the journalling member 1. The bearing pin 9b, on the other hand, is provided with the bearing 11a and carries the bevel gear 8 and the disk 10.

As noted earlier, the motion sensor 20 of FIGS. 1 and 1a has a horizontal orientation in that the shaft 3 and bearing pins 4, 9 are horizontal. In contrast, the motion sensor 20" has a vertical orientation. Thus, the bearing pins 4, 9a, 9b extend vertically and coincide with the Z-axis. Correspondingly, the journalling member 1 of the motion sensor 20" is rotated 90 degrees from the journalling member 1 of the motion sensor 20. In the motion sensor 20, the longer sides 5a, 5b of the journalling member 1 extend horizontally while the shorter sides 6a, 6b are located next to one another in vertical planes. On the other hand, the longer sides 5a, 5b of the motion sensor 20" extend vertically whereas the shorter sides 6a, 6b are disposed one above the other in horizontal planes. The shorter side 6a of the motion sensor 20" is situated above the shorter side 6b and constitutes the upper side of the journalling member 1 of the motion sensor 20".

The bearing tip 4a and bearing 11a of the motion sensor 20" are located between the bevel gear 8 and the upper side 6a of the journalling member 1. Furthermore, the bearing tip 4a and bearing 11a of the motion sensor 20' are movable relative to one another in the direction of the axes of rotation of the bearing pins 4, 9a, 9b, i.e., in the direction of the Z-axis. Since the bearing 11a of the motion sensor 20" is fast with the bearing pin 9b while the cooperating bearing tip 4a is formed as a unit with the bearing pin 4, the bearing pin 9b is uncoupled from the bearing pin 4. The bearing 11a of the motion sensor 20" preferably constitutes a floating bearing.

The bearing pin 9b has a solid cross section. However, it is also possible for the bearing pin 9b to be hollow. In this case, the journalling member 1 of the motion sensor 20" is provided with a pin or peg which is receivable by the hollow bearing pin 9b so as to reliably support the latter for rotation while maintaining the bearing pin 9b uncoupled from the bearing pin 4.

The bevel gears 7, 8 of the motion sensor 20" can constitute a friction drive. This allows force to be transmitted between the shaft 3 and the bearing pin 9b even if the bearing pins 4, 9b are out of alignment with one another.

The bearing 11b of the motion sensor 20", as well as a non-illustrated bearing for the end of the shaft 9b remote from the bearing 11a, are preferably located outside of a space defined by: (a) the plane of the bevel gear 7; (b) the plane of the disk 10; (c) a plane parallel to, and on the opposite side of the Z-axis from, the bevel gear 7 and tangential to the disk 10; and (d) a plane parallel to, and on the opposite side of the X-axis from, the disk 10 and tangential to the bevel gear 7. The shaft 3 and bearing pins 4, 9a, 9b of the motion sensor 20" can then rotate about the X and Z axes through 360 degrees without hindrance.

The motion sensor 20" includes a printed circuit board 16 having contact pins 15. The circuit board 16 contains circuitry for processing signals generated by the sensing device 12.

The motion sensor 20" is enclosed by a housing or casing 13 which is provided with openings for the contact pins 15 of the circuit board 16. The contact pins 15 project outward from the casing 13 through such openings. Mounting pins 14 permit the casing 13 to be mounted at any location of an object to be monitored. By appropriate design of the motion sensor 20", the latter can be employed as a readily interchangeable antitheft device for a passenger car.

Figure 6:
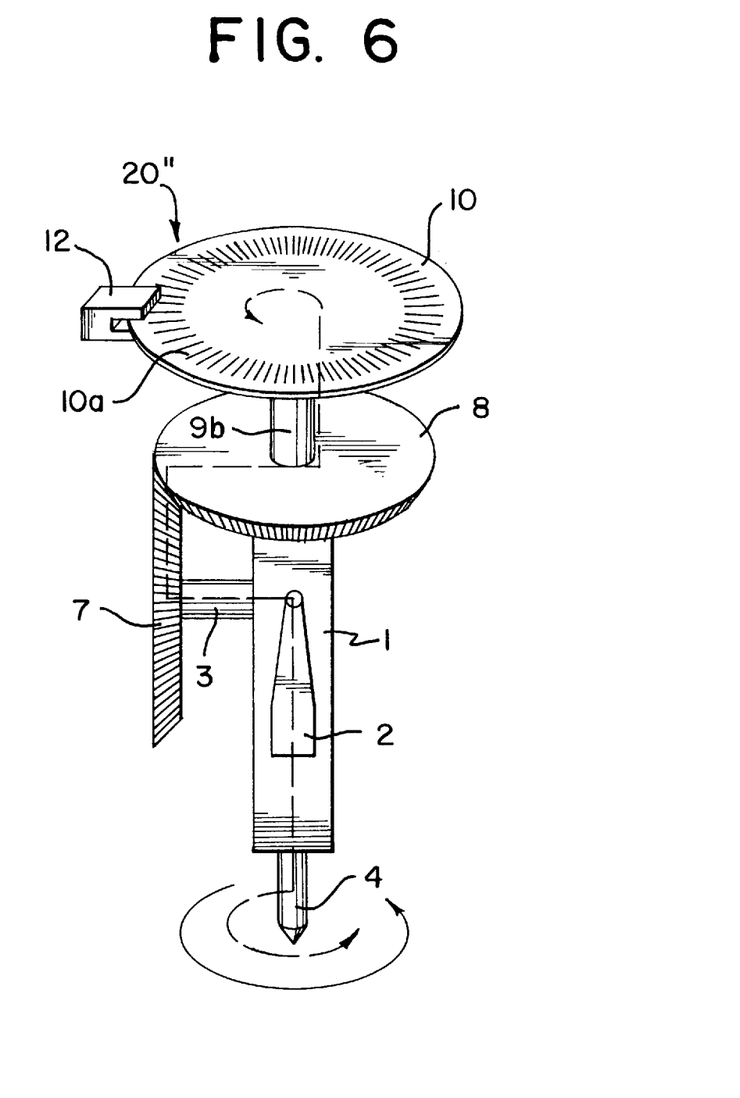
FIG. 6 shows the force flux generated in the motion sensor of FIG. 3 in response to movement.

In FIG. 6, a heavy broken line indicates the force flux through the motion sensor 20" when an object on which the motion sensor 20" is mounted is tilted about the axis of the shaft 3.

The motion sensor 20" is preferably used to detect combined movements in the XY plane. Thus, the disk 10 reacts to very small displacements along both the X-axis and the Y-axis because the bearing means for the journalling member 1 and the weight 2 acts as a universal joint. Due to the placement of the bearing tip 4a and bearing 11a between the journalling member 1 and the disk 10, positional changes can be determined as resultants in the XY-plane. Movements in the three-dimensional coordinate system which are not parallel to the axes cause changes in the relative position of the disk 10 and the sensing device 12, and such changes are amplified by variations in movement of the weight 2. Rotational movements about the Z-axis are also detectable.

Figure 7:
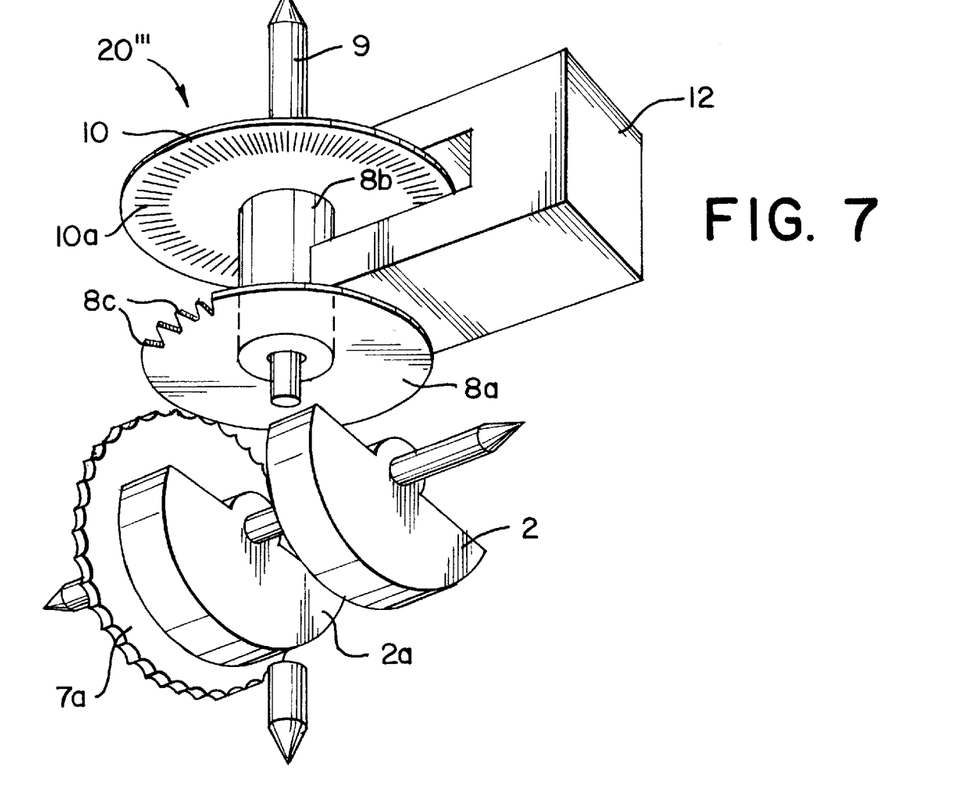
FIG. 7 is a perspective view of a further embodiment of the motion sensor according to the invention.
Figure 8:
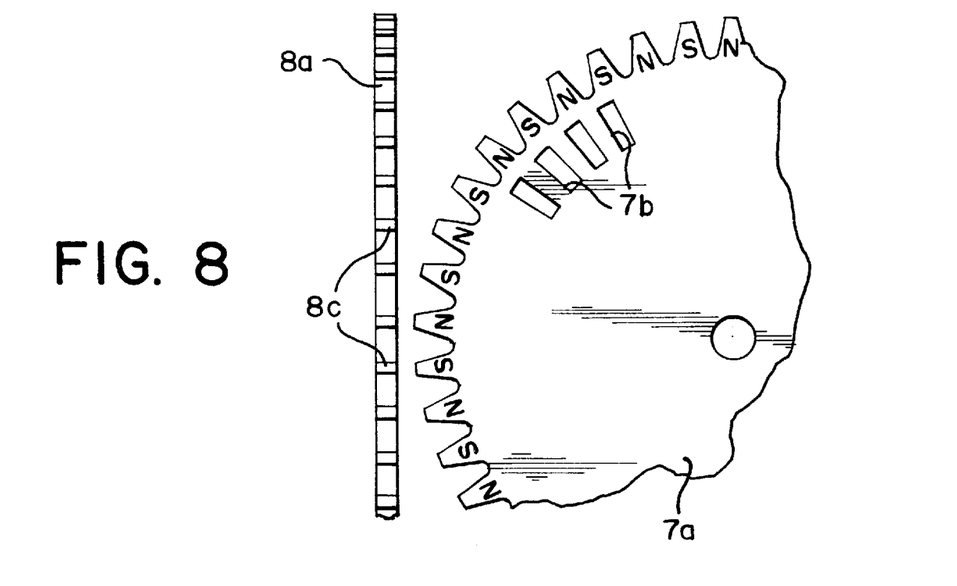
FIG. 8 is a fragmentary side view of a transmission constituting part of the motion sensor of FIG. 7.

FIGS. 7 and 8 show a further motion sensor 20''' in accordance with the invention. In FIGS. 7 and 8, the same reference numerals as in FIGS. 1–6 are used to identify similar elements.

The motion sensor 20''' resembles the motion sensor 20' but differs from the latter in that the bevel gear 7 is replaced by a toothed disk or wheel 7a with magnetized teeth. The disk 7a has an even number of teeth each of which constitutes a north pole N or a south pole S. The north poles N and south poles S alternate circumferentially of the disk 7a. The disk 7a is provided with recesses 7b which enhance the magnetic action of the disk 7a.

Furthermore, in the motion sensor 20''', the bevel gear 8 is replaced by a weakly magnetic disk or wheel 8a which, if desired, can be formed with teeth 8c of the same pitch as those of the disk 7a. The disk 8a is fast with a sleeve 8b which surrounds, and is rotatable relative to, the bearing pin 9. The timing disk 10 is likewise fast with the sleeve 8b.

As best seen in FIG. 8, the disks 7a and 8a are spaced from one another by a narrow gap so that no contact exists between the disks 7a and 8a. The magnetic flux of the disk 7a extends across the gap and through the disk 8a.

Consequently, the disk 8a rotates in response to rotation of the disk 7a as if the disks 7a and 8a were meshing gears. However, in contrast to meshing gears, the disk 8a is caused to rotate in the absence of contact with the disk 7a, and the disks 7a, 8a accordingly constitute a contactless magnetic transmission.

The disk 10 can be transparent or reflective. Depending upon whether the disk 10 is transparent or reflective, the sensing device 12 faces one side or both sides of the disk 10. Approximately 1000 lines 10a can be applied to a disk 10 having a diameter of 1" so that a resolution of 10 arc-minutes can be obtained. The response angle is then 0.5 degree.

An important advantage of the motion sensors 20–20''' is that positional changes about at least two axes can be detected with only one sensing device 12 thereby allowing a second sensing device to be eliminated. The elimination of a second sensing device permits a very low energy consumption of approximately 5 mA to be achieved in the standby state. This assumes, however, that the sensing device 12 pulsates, e.g., switches on for about 10 milliseconds and off for about 30 milliseconds. The sensing device 12 can be a standard sensing device of the type marketed by Hewlett Packard, for example. The sensing device 12 may be used over a temperature range of –40 degrees Centigrade to +80 degrees Centigrade and, in special cases, up to a temperature of +140 degrees Centigrade.

The disk 10 may be made from conventional film which can be provided with extremely precise marks 10a, i.e., extremely precise light and dark areas. Other materials such as etched metal disks and vapor-deposited plastics may also be used for the disk 10. By using only a single disk 10 and a single sensing device 12, it is possible to do away with complicated electronics for evaluating the signals generated by the sensing device 12.

The effects of climate and dust may be precluded by virtually completely enclosing the motion sensors 20–20''' in a casing such as the casing 13. Only the contact pins (see the pins 15 in FIG. 3) which provide a connection to the sensing device 12 need project from the casing. The casing can be designed to be dustproof and to exclude the effects of moisture and oil vapors.

It has been found that the motion sensors 20–20''' can be employed to measure acceleration in any axial direction. The motion sensors 20–20''' are accordingly usable for safety technology and for the destructive and non-destructive testing of samples.

The bevel gears 7, 8 are preferably made of plastic. However, the materials, such as stainless steel and non-ferrous metals, employed in conventional watch movements can also be used for the bevel gears 7, 8.

Typical dimensions for a casing which accommodates the motion sensors 20–20''' are 30 mm×30 mm×30 mm. The total weight of such a casing plus the complete motion sensor 20, 20', 20'' or 20''' can be of the order of 30 grams with further miniaturization, smaller housings having dimensions of about 20 mm×20 mm×20 mm can also be used.

Various modifications are possible within the meaning and range of equivalence of the appended claims.

I claim:

1. A motion sensor, comprising a first rotatable shaft having a first axis of rotation; a force unit on said first shaft arranged to generate a force in response to a displacement about said first axis, said force unit and said first shaft being rotatable together about a second axis of rotation; a second shaft having an axis of rotation which substantially coincides with said second axis; a journalling member for said first shaft, said member having a first pair of sides and a second pair of sides, and said first shaft being journalled in at least one side of said first pair, said second shaft being mounted on one side of said second pair; a displacement indicator fast with said second shaft and rotatable therewith about said second axis; and a transmission between said first shaft and said indicator for rotating said indicator about said second axis in response to rotation of said first shaft about said first axis.

2. The sensor of claim 1, wherein said force unit comprises a weight.

3. The sensor of claim 1, wherein said force unit comprises a pendulum.

4. The sensor of claim 1, wherein said indicator comprises a disk provided with marks.

5. The sensor of claim 4, further comprising a detector for said marks.

6. The sensor of claim 1, wherein said one shaft and said additional shaft are substantially perpendicular to one another.

7. The sensor of claim 1, wherein said transmission comprises a first gear fast with said one shaft and a second gear in mesh with said first gear and fast with said additional shaft.

8. The sensor of claim 1, wherein said member is frame-like.

9. The sensor of claim 8, wherein said one side of said first pair is provided with an opening for said one shaft at approximately the middle of said one side of said first pair, said additional shaft being mounted on said one side of said second pair at approximately the middle of said one side of said second pair.

10. The sensor of claim 9, wherein said member is substantially rectangular and said sides of said first pair are longer than said sides of said second pair.

11. The sensor of claim 8, further comprising another shaft having an axis of rotation which substantially coincides with said second axis, said other shaft being mounted on the other side of said second pair.

12. The sensor of claim 11, further comprising bearings for said additional shaft and said other shaft.

13. The sensor of claim 1, wherein said first and second axes define a substantially horizontal plane.

14. A motion sensor, comprising a first rotatable shaft having a first axis of rotation; a force unit on said first shaft arranged to generate a force in response to a displacement about said first axis, said force unit and said first shaft being rotatable together about a second axis of rotation; a second shaft having an axis of rotation which substantially coincides with said second axis; a substantially rectangular frame-like member, said first shaft being journalled in said member; a third shaft having an axis of rotation substantially coincident with said second axis and supporting said member for rotation about said second axis; a displacement indicator fast with said second shaft and rotatable therewith about said second axis; and a transmission between said first shaft and said indicator for rotating said indicator about said second axis in response to rotation of said first shaft about said first axis, said transmission including a first bevel gear fast with said first shaft and a second bevel gear in mesh with said first gear and fast with said second shaft.

15. A motion sensor, comprising a first rotatable shaft having a first axis of rotation; a force unit on said first shaft arranged to generate a force in response to a displacement about said first axis, said force unit and said first shaft being rotatable together about a second axis of rotation; a second shaft having an axis of rotation which substantially coincides with said second axis; a journalling member for said first shaft rotatable about said first axis, said second shaft and said member being provided with cooperating bearing portions, and said bearing portions being movable relative to one another along said second axis; a displacement indicator fast with said second shaft and rotatable therewith about said second axis; and a transmission between said first shaft and said indicator for rotating said indicator about said second axis in response to rotation of said first shaft about said first axis.

16. The sensor of claim 14, wherein one of said bearing portions comprises a floating bearing.

17. The sensor of claim 14, wherein said transmission comprises a first gear fast with said one shaft and a second gear in mesh with said first gear and fast with said additional shaft, said member having an upper side, and said bearing portions being located between said upper side and said second gear.

18. A motion sensor, comprising a first rotatable shaft having a first axis of rotation; a force unit on said first shaft arranged to generate a force in response to a displacement about said first axis, said force unit and said first shaft being rotatable together about a second axis of rotation; a journalling member for said first shaft; a second shaft having an axis of rotation substantially coincident with said second axis and supporting said member for rotation about said second axis; a bearing for said second shaft; a displacement indicator rotatable about said second axis; and a transmission between said first shaft and said indicator for rotating said indicator about said second axis in response to rotation of said first shaft about said first axis, said transmission including a first gear fast with said first shaft and a second gear in mesh with said first gear and connected with said indicator, said first gear having a first periphery and being located in a first plane, and said indicator having a second periphery and being located in a second plane which intersects said first plane, said bearing being located outside of a space bounded by said first and second planes and by two additional planes which are respectively substantially parallel to said first and second planes and tangential to respective ones of said peripheries.

19. A motion sensor, comprising at least one rotatable shaft having a first axis of rotation; a force unit on said one shaft arranged to generate a force in response to a displacement about said first axis, said force unit and said one shaft being rotatable together about a second axis of rotation; a journalling member for said one shaft, said one shaft being disposed within the confines of said member; a displacement indicator rotatable about said second axis; and a transmission between said first shaft and said indicator for rotating said indicator about said second axis in response to rotation of said first shaft about said first axis.

20. A motion sensor, comprising at least one rotatable shaft having a first axis of rotation, said one shaft having a pair of end portions, and said one shaft being supported for rotation on a tapered bearing element at each of said end portions; a force unit on said one shaft arranged to generate a force in response to a displacement about said first axis, said force unit and said one shaft being rotatable together about a second axis of rotation; a displacement indicator rotatable about said second axis; and a transmission between said first shaft and said indicator for rotating said indicator about said second axis in response to rotation of said first shaft about said first axis.

21. The sensor of claim 20, further comprising an additional shaft having an axis of rotation which substantially coincides with said second axis, said indicator being fast with said additional shaft.

22. The sensor of claim 20, wherein said bearing elements are pointed.

23. A motion sensor, comprising at least one rotatable shaft having a first axis of rotation; a force unit on said one shaft arranged to generate a force in response to a displacement about said first axis, said force unit and said one shaft being rotatable together about a second axis of rotation; a journalling member for said one shaft, said journalling member having a first surface to one side of a plane defined by said first and second axes and a second surface to the other side of said plane, and said second axis being located closer to one of said surfaces than to the other of said surfaces; a displacement indicator rotatable about said second axis; and a transmission between said first shaft and said indicator for rotating said indicator about said second axis in response to rotation of said first shaft about said first axis.

24. A motion sensor, comprising at least one rotatable shaft having a first axis of rotation; a force unit on said one shaft arranged to generate a force in response to a displacement about said first axis, said force unit and said one shaft being rotatable together about a second axis of rotation; a displacement indicator rotatable about said second axis; and a magnetic transmission between said first shaft and said indicator for rotating said indicator about said second axis in response to rotation of said first shaft about said first axis.

25. The sensor of claim 24, wherein said transmission comprises a pair of spaced magnetic disks.

26. The sensor of claim 25, wherein one of said disks comprises alternating north and south poles circumferentially thereof.

27. The sensor of claim 26, wherein the other of said disks is weakly magnetic.

* * * * *